Sept. 9, 1969                R. L. SELS                3,466,552
RATIOMETER SYSTEM UTILIZING PHASE COMPARISON TECHNIQUES
Filed March 10, 1966
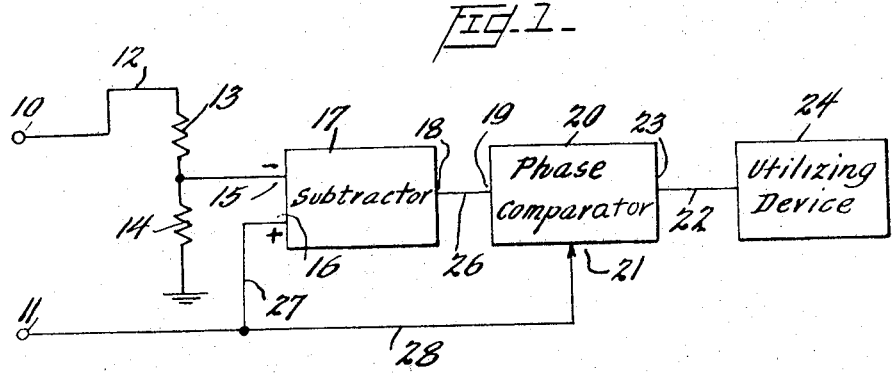
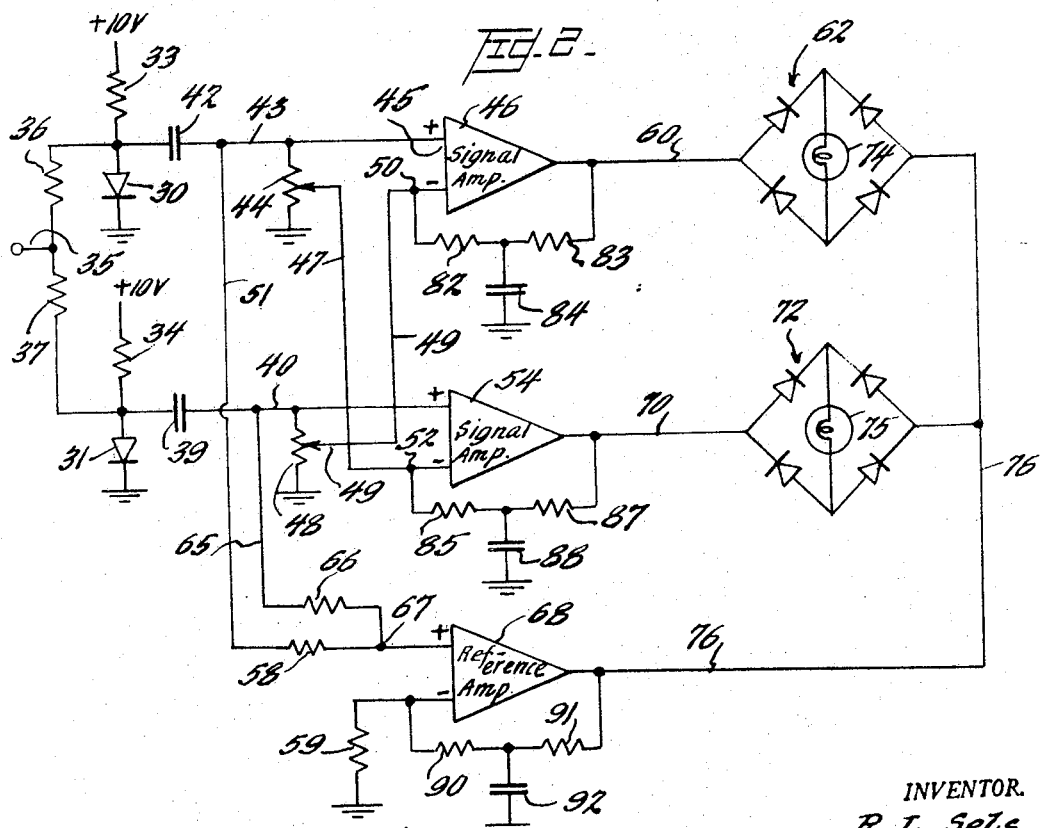
INVENTOR.
R. L. Sels,
BY J. M. Presson
ATTORNEY

United States Patent Office 3,466,552
Patented Sept. 9, 1969

3,466,552
RATIOMETER SYSTEM UTILIZING PHASE
COMPARISON TECHNIQUES
Robert L. Sels, Reading, Pa., assignor to Western Electric
Company, Incorporated, New York, N.Y., a corporation of New York
Filed Mar. 10, 1966, Ser. No. 533,345
Int. Cl. G06g 7/14; H03k 5/20
U.S. Cl. 328—147       3 Claims

ABSTRACT OF THE DISCLOSURE

A first voltage and a fraction of a second voltage are applied as inputs to a differential amplifier and the second voltage and a fraction of the first voltage are applied as inputs to another differential amplifier. The outputs of the differential amplifiers are compared with the original voltages to detemine if there is a phase difference therebetween. By adjusting the fraction of the first and second voltages which are applied to the differential amplifiers, there may be determined when the ratio of the first voltage to the second voltage is outside a predetermined range.

---

This invention relates generally to ratiometer systems and more particulraly, to a system utilizing phase comparison techniques for determining whether the ratio of a first voltage to a second voltage is greater or less than a predetermined value.

Certain types of rotiometer systems utilize a D.C. comparator having an input circiut that is designed to render the signals applied to the comparator equal if the input signal amplitudes are in a preselected ratio relationship. If the amplitudes of the signals being compared have values which are relatively close to each other, the amplitude of the output signal from the comparator diminishes. If, for example, the ratio of two voltages in the one volt range are compared and an accuracy of 1% is required, the output of a comparator having a gain of unity will be less than 10 millivolts for a ratio within limits. If the comparator has a gain greater than unity, D.C. drifts in the comparator will be multiplied by the gain of the comparator. Devices responsive to such output voltages in the millivolt range are also subject to error-producing D.C. drifts.

Ratiometer systems employing digital pulse counting techniques are generally complex and require large numbers of components. From a statistical standpoint a system having a large number of components is less reliable than one having a lesser number of components. The accuracy of this class of systems is generally limited by the accuracy of the analog-to-digital converters used.

Broadly, it is an object of this invention to provide a system for comparing and determining the ratio between two input signals which does not multiply D.C. drift errors in the system.

More specifically, it is an object of this invention to provide a system that utilizes novel phase comparison techniques for determining whether the ratio of two voltage amplitudes is between certain predetermined limits.

With these and other objects in view, the present invention contemplates a system for performing the functions of dividing a first time-varying quantity by a predetermined ratio to provide a time-varying quotient. The quotient is subtracted from a second time-variable quantity having equal frequency and phase as the first time-varying quantity. The time-varying difference resulting from the subtraction has the same frequency as the first and second time-varying quantities. The system then compares the phase of the difference to the phase of the time-varying quantities. If the phases are not equal a ratio greater than the predetermined value is indicated.

In accordance with one specific embodiment of this invention, the ratio of two A.C. voltages is compared with a predetermined value, which may be unity or a value other than unity, by using a potentiometer to divide one of the two voltages by the predetermined value. The second voltage is compared to the quotient voltage in a differential amplifier, and the output of the differential amplifier is phase-compared with the first and second voltages by a bridge. If there is a phase difference between the first and second voltages and the output of the differential amplifier, the resulting output of the bridge is utilized to initiate an indicating device.

Other objects and advantages of the invention will become apparent by reference to the following detailed specification and accompanying drawings wherein:

FIG. 1 is a block diagram of a ratiometer, constructed in accordance with the principles of the instant invention, for determining whether the ratio of the amplitudes of two A.C. voltages is greater or less than a predetermined value.

FIG. 2 illustrates a detailed circuit diagram of one embodiment of the invention which is utilized to match the forward impedance characteristics of a pair of diodes.

Referring now to FIG. 1 of the drawings for a more complete understanding of this invention, an input terminal 10 is connected by a lead 12 to a voltage divider formed of resistors 13 and 14. The junction of the resistors 13 and 14 is attached to a negative input terminal 15 of a voltage subtracting device 17. Another input terminal 11 is connected directly to a positive input terminal 16 of the subtracting device 17 by a lead 27.

An output terminal 18 of the subtracting device 17 is connected to one input terminal 19 of a phase comparator 20 by a lead 26. Another input terminal 21 of the phase comparator 20 is connected directly to the input terminal 11 by a lead 28. The output terminal 23 of the phase comparator 20 is connected by a lead 22 to a suitable utilization device 24.

The system operates when a first A.C. voltage, derived from a first A.C. voltage source (not shown), is applied to the input terminal 10, and a second A.C. voltage, derived from a second A.C. voltage source (not shown) is applied to the input terminal 11. Both A.C. voltages necessarily have the same frequency and phase. It is to be understood that voltages of the same frequency need not be pure sinusoids but may be of any waveform such as a square wave which may be broken down by Fourier analysis into a series of pure sinusoids. Therefore, the terms "voltages having equal frequency and phase," as used herein, should be interpreted as including those voltage signals whose major Fourier components have the same frequency and phase. As will be understood by those working in this and related arts, it is a relatively simple matter to phase-shift two waveforms having equal frequency but different phase by employing, for example, conventional filters and delay lines.

Referring again to FIG. 1, a fraction of the first voltage, determined by the preselected values of the resistors 13 and 14 is subtracted from the second voltage by the operation of the subtracting device 17. The difference signal appearing at the output terminal 18 of the subtracting device 17, will have the same fundamental frequency as the applied voltages but will have the same phase if the ratio of the first input voltage to the second input voltage is less than a predetermined ratio, the ratio being determined by resistors 13 and 14. If the ratio of the first to second input voltage is greater than the predetermined one, the voltage signal appearing at the output terminal 18 will be phase-shifted 180° relative to the input signal voltages. The difference at the output terminal 18 may have frequency components, in addition to the ones present in the applied voltages due to nonlinearities in the subtracting device 17. The input voltage applied to the terminal 11 is transmitted through the line 28 to the input terminal 21 of the phase comparator 20. The phase of the difference voltage appearing at the output terminal 18 is then compared by the phase comparator 20 to the phase of the coincidental input voltage applied to the terminal 21 of the comparator 20.

The phase comparator 20 is a conventional device characterized in that when two input signals of the same phase are applied to it, the comparator 20 will assume one state, whereas two input signals having different phases will cause the comparator 20 to assume another state. The output of the phase comparator 20 is transmitted by the lead 22 to the utilization device 24. The utilization device 24 may be connected to the comparator 20 in ways known in the art so as to indicate conditions of either equal phase or unequal phase, or to provide one response to an equal phase condition and another response to an unequal phase condition. Any suitable device which responds to electrical signals, of a type produced by the comparator 20, such as indicators, relays or transistors, could be used as a utilization device.

From the foregoing discussion it can be seen that the accuracy of the system of the instant invention is insensitive to amplitude variations in the signal anywhere in the system beyond the input terminals 15 and 16 of the subtracting device 17. It will be evident that this system, although described as comparing two A.C. voltages, may be employed to compare two D.C. voltages, if the D.C. voltages are initially chopped into square waves, and the square waves applied to the input terminals 10 and 11.

FIG. 2 illustrates the possible utilization of the invention for ascertaining whether the ratio of the forward dynamic impedance of one diode 30 to the forward dynamic impedance of another diode 31 is within certain predetermined limits. This determination is accomplished by first establishing equal forward D.C. currents through the diodes 30 and 31 by applying battery of, for example, +10 volts to the resistors 33 and 34, respectively.

A sine wave voltage produced by a generator, not shown, is applied to terminal 35. The sine wave voltage is converted by resistors 36 and 37 into two equal sine wave current signals. The sine wave signals are small with respect to the D.C. current through resistors 33 and 34 so that any effect on the D.C. biases may be neglected. One current signal is applied to the anode of each diode 30 and 31 and produces an A.C. voltage signal at each anode. The amplitude of each of the voltage signals across the diodes 30 and 31 is proportional to the dynamic forward impedance of the diodes 30 and 31 at the applied D.C. bias current. The A.C. signal appearing at the anode of diode 30 passes through a coupling capacitor 42, appears as a voltage drop across a potentiometer 44, and is applied by a lead 43 to a positive input terminal 45 of a differential or signal amplifier 46.

The A.C. signal appearing at the anode of the diode 31 passes through a coupling capacitor 39, is received by a lead 40 and appears as a voltage drop across a potentiometer 48. This voltage is transmitted by a lead 49 to a negative input terminal 50 of the differential amplifier 46. Only a fraction of the signal applied to the lead 40, as determined by the setting of the potentiometer 48, is impressed upon the negative input terminal 50 of amplifier 46. Similarly, only a fraction of the voltage applied to lead 43, as determined by the setting of potentiometer 44, is impressed on a negative input terminal 52 of a differential or signal amplifier 54.

The output voltage of the amplifier 46 is applied through a lead 60 to one side of a conventional diode bridge 62. The output of the amplifier 54 is applied through a lead 70 to one side of another conventional diode bridge 72. Indicating lamps 74 and 75 are connected across opposite arms of the bridges 62 and 72, respectively. The A.C. component of the voltage passing through the capacitor 42 and appearing on the lead 43 is received by a lead 51 and applied to the left side of a resistor 58. The A.C. component of the signal passing through the capacitor 39 is received by a lead 65 and applied to the left side of a resistor 66. The right side of the resistors 58 and 66 are joined together and connected to a positive input terminal 67 of a differential or reference amplifier 68. The terminal 67 will receive the average of the signals through capacitors 42 and 39 if the resistors 58 and 66 are of equal resistance. An output of the differential amplifier 68 is connected to the right sides of both the diode bridges 62 and 72 by a common lead 76.

The differential amplifiers 46, 54 and 68 are essentially identical and of a well-known operational type, characterized as having two inputs and one output. Further, these amplifiers are characterized such that a positive signal applied to the positive input terminal will produce a positive signal at the output terminal which is typically more than ten thousand times greater than the input signal. A positive signal applied to the negative input will produce a negative output signal more than ten thousand times greater than the positive input signal.

Each differential amplifier includes a low pass filter in the feedback loop that connects from the output of the amplifier back to its negative input terminal. These filters include two networks individually comprised of two resistors and a capacitor. Thus, the filter network of amplifier 46 comprises resistors 82 and 83 and capacitor 84, the filter associated with amplifier 54 comprises resistors 85 and 87 and a capacitor 88, and the filter associated with amplifier 68 comprises resistors 90 and 91 and a capacitor 92. The purpose of these filter networks is to provide negative feedback at low frequencies so that the overall gain of the amplifiers at these low frequencies is low as determined by the values of the resistors in the filters. At higher frequencies the gain is essentially the open loop gain of the amplifier since the low pass filter will not feed back the higher frequency signals. The filter is chosen so that the frequencies of the input signals are high compared with the cutoff frequency of the filter. In this way, D.C. and low frequency variations in the characteristics of the amplifiers will not affect the proper functioning of the system.

If the ratio of the signal voltage amplitude appearing on the lead 43 to the signal voltage amplitude appearing on lead 40 is greater than the ratio predetermined by the setting of the potentiometer 48, the output signal received by the lead 60 will be in phase with the signal received by the lead 76. This is so because the signal appearing at the positive input terminal 67 of the operational amplifier 68 is in phase with the signal appearing at the positive input terminal 45 of the amplifier 46 and the amplitude of the signal appearing at the input terminal 45 is greater than the amplitude of the signal appearing at the negative input terminal 50 of the same operational amplifier 46. Therefore, indicating lamp 74 will not light since the phase of the signals appearing on the lines 60 and 76 and across the diode bridge 62 are the same. Assuming that the amplitude ratio of the signal appearing on the lead 40 to the signal appearing on the lead 43 as preselected by the setting of the potentiometer 44 is the same as the ratio of the signal appearing on the lead 43 to the signal appearing on the lead 40 as preselected by the potentiometer 48, it can be seen that with the signals as above-described, the input voltage on the negative input terminal 52 of the operational amplifier 54 will be greater than the input voltage on the positive input terminal and the indicating lamp 75 will illuminate because of a phase difference of the signals applied to the leads 70 and 76. Obviously, if the amplitude of the signal appearing on the lead 43 is less than the amplitude of the voltage applied to the negative input terminal 50 of the operational amplifier 46, the indicating lamp 74 will illuminate and the lamp 75 will remain unlit.

The amplitude ratio of the signal on the lead 43 to the signal on the lead 40 is the ratio of the dynamic impedance of the diode 30 to the dynamic impedance of the diode 31. The amplitude ratio of the signal on the lead 40 to the signal on the lead 43 is the inverse of the ratio of the dynamic impedance of the diode 30 to the dynamic impedance of the diode 31. Therefore, indicator 74 will indicate when the ratio of the dynamic impedance of the diode 30 to the dynamic impedance of the diode 31 is below the value preselected by the potentiometer 48 while indicator 75 will indicate when the ratio of the dynamic impedance of the diode 30 to the dynamic impedance of the diode 31 is above the value preselected by the potentiometer 44.

If the potentiometers 44 and 48 are now set such that potentiometer 48 is set to select a predetermined ratio between the two dynamic impedances less than the ratios of dynamic impedances which the potentiometer 44 is set to select, it is apparent that there would be a range of conditions under which neither lamp 74 or 75 would light. If the ratio of the two signals is less than a certain value predetermined by the potentiometer 48, the lamp 74 will illuminate and if they were greater than the value established by potentiometer 44, the lamp 75 would illuminate. The lamps 74 and 75 then provide a visual indication to an operator as to whether the diodes are out of the preselected range and if the ratio is greater or less than the predetermined value.

If it is not necessary to know whether the ratio of dynamic impedances is greater or less than the predetermined value, but only if the ratio is outside of the allowable range, a comparison device, such as the diode bridge 62, could be connected directly to the leads 60 and 70. The indicating lamp 74 will illuminate whenever the ratio of the voltage output signals from the amplifiers 46 and 54 is either above or below the predetermined limits.

It is to be understood that these embodiments are merely illustrative of the principles of the invention, and other embodiments will become obvious to one skilled in the art.

What is claimed is:

1. In a device for determining the ratio of a first A.C. voltage to a second A.C. voltage, both voltages having substantially the same frequency and phase;
   a first differential amplifier having a first and a second input terminal and an output terminal,
   means for applying the first A.C. voltage to said first input terminal,
   means for applying a third A.C. voltage which is a predetermined fraction of the second A.C voltage to said second input terminal of said first differential amplifier,
   a second differential amplifier having a first and a second input terminal and an output terminal,
   means for applying the second A.C. voltage to said first input terminal of said second differential amplifier,
   means for applying a fourth A.C. voltage which is a predetermined fraction of the first A.C. voltage to said second input of said second differential amplifier,
   means responsive to signals of equal frequency having different phase,
   means for connecting said output of said first differential amplifier to the phase responsive means, and
   means for connecting said output of said second differential amplifier to said phase responsive means.

2. In a system for determining whether the ratio of a first voltage to a second voltage is greater than a first predetermined value or less than a second predetermined value;
   a first differential amplifier;
   means for applying the first voltage to the first differential amplifier;
   first voltage dividing means for applying a fraction of the second voltage as determined by said second predetermined value to the first differential amplifier;
   a second differential amplifier;
   means for applying the second voltage to the second differential amplifier;
   second voltage dividing means for applying a predetermined fraction of the first voltage as determined by said first predetermined value to the second differential amplifier;
   means responsive to signals of equal frequency having different phase for indicating when the ratio of the first voltage to the second voltage is less than said second predetermined value; and
   means responsive to signals of equal frequency having different phase for indicating when the ratio of the first voltage to the second voltage is greater than said first predetermined value.

3. In a system for determining when a ratio of a first to a second time varying quantity having substantially equal frequencies and phase is outside a predetermined range;
   first means for subtracting the first time varying quantity and a fraction of said second time varying quantity to produce an output signal having a phase which is a function of the greater time varying quantity;
   second means for subtracting a fraction of the first time varying quantity and the second time varying quantity to produce an output signal having a phase which is a function of the greater time varying quantity; and
   means responsive to signals having the same frequency and different phase for comparing the phase of said output signals with the first and second time varying quantities to indicate when the ratio of said first time varying quantity to the second time varying quantity is outside said predetermined range.

References Cited

UNITED STATES PATENTS

| 2,579,001 | 12/1951 | Jeffers | 328—146 |
| 2,763,838 | 9/1956 | McConnell | 330—69 |
| 3,121,843 | 2/1964 | Ule | 328—109 |
| 3,330,972 | 7/1967 | Malan | 328—147 |
| 3,335,606 | 8/1967 | Scarpa | 338—23 |

JOHN S. HEYMAN, Primary Examiner

H. A. DIXON, Assistant Examiner

U.S. Cl. X.R.

307—235, 261, 295